July 1, 1930. B. E. SMITH 1,769,652
VARIABLE SPEED INDUCTION MOTOR
Filed Jan. 25, 1928 3 Sheets-Sheet 1

INVENTOR
Byron E. Smith
BY
ATTORNEY

July 1, 1930.   B. E. SMITH   1,769,652
VARIABLE SPEED INDUCTION MOTOR
Filed Jan. 25, 1928   3 Sheets-Sheet 2

INVENTOR
*Byron E. Smith*
BY
*G. Wright Arnold*
ATTORNEY

July 1, 1930.  B. E. SMITH  1,769,652
VARIABLE SPEED INDUCTION MOTOR
Filed Jan. 25, 1928   3 Sheets-Sheet 3
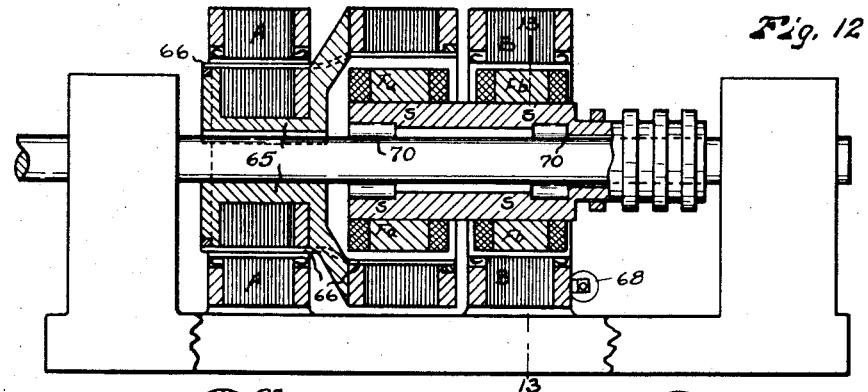
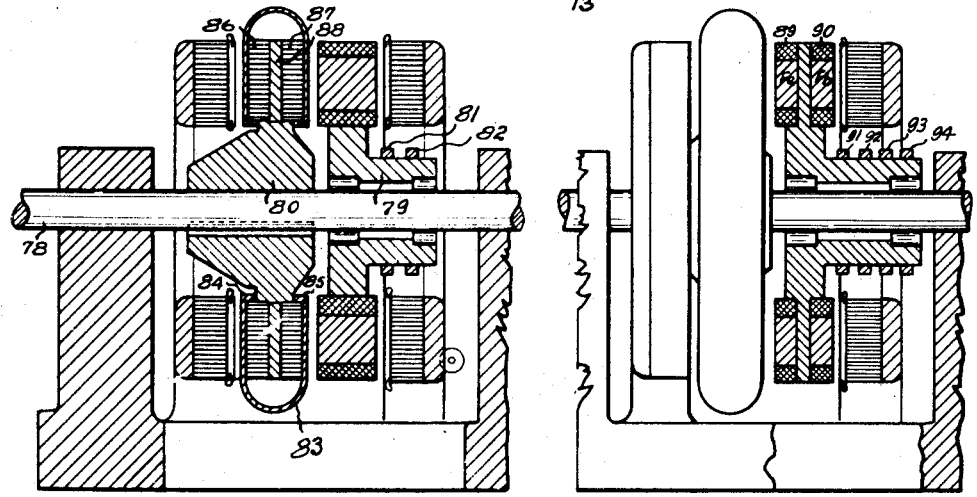
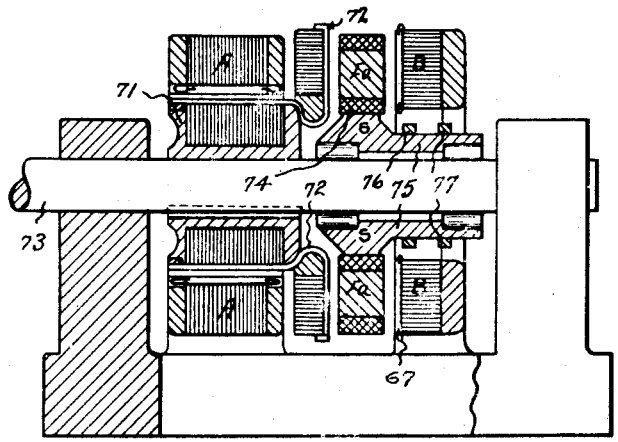
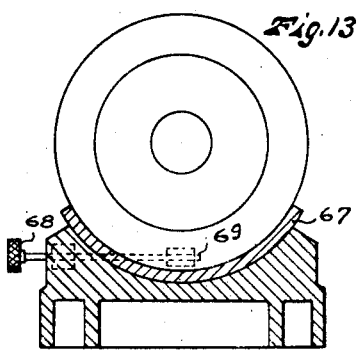
INVENTOR
*Byron E. Smith*
BY
*G. Wright Arnold*
ATTORNEY Patented July 1, 1930

1,769,652

UNITED STATES PATENT OFFICE

BYRON E. SMITH, OF KETCHIKAN, TERRITORY OF ALASKA

VARIABLE-SPEED INDUCTION MOTOR

Application filed January 25, 1928. Serial No. 249,232.

My invention relates to a method of producing varying speeds in a polyphase alternating current induction motor and to a motor for carrying out said method. More particularly, my invention relates to a new and improved method of producing in an induction motor a variable torque adjustable at will by the operator regardless of the shaft speed, and of maintaining at all times a large measure of control over the power factor of the circuit, such new method being characterized by simplicity and effectiveness of control and adjustability, as well as to an induction motor for carrying out said method, this motor being characterized by its economy both as to construction and as to operation and by improved electrical efficiency at fractional speeds.

Objectionable features are inherent in all methods of speed control commonly employed at the present time, in that they either dissipate energy wastefully or they involve the use of either commutator motors or of expensive auxiliary apparatus which in general gives only partial and unsatisfactory control and which is always idle and useless at full speed when the system is called upon to carry its maximum load. In general, it is a primary purpose of my invention to overcome these objections and to provide a method of producing variable speeds in a polyphase alternating current induction motor which is so constructed that, at partial speeds, at the will of the operator, it may, in and of itself, be caused to absorb slip energy from the rotor and return this energy, regenerated, to the supply circuit through a part of its own primary windings.

A further purpose of my invention is to provide a motor, the primary windings of which are divided into two parts, one herein called the "A" stator winding and the other the "B" stator winding, the function of which latter element may be reversible so that, without opening the primary circuit, the said B winding may be used at partial speeds to return the slip energy, regenerated, to the supply circuit. Also, a purpose of my invention is to provide a motor in which said regenerative element (B stator) of the primary winding will, as the motor approaches full speed, be available for carrying its proper share of the load in the usual manner, functioning in its normal capacity as a part of the primary winding of an alternating current motor.

Further, a purpose of my invention is to provide an induction motor in which the power factor and current in the secondary circuit may be so controlled as to produce a torque increasing with the slip and yielding a maximum torque at low speeds. A further purpose of my invention is to provide a motor wherein the torque may be so controlled that the machine may be caused to yield an approximately constant torque with varying speed. A further purpose is to provide a motor wherein the torque may be so varied by the use of a suitable controller actuated through a governing device on the shaft, that the machine may be caused to operate at approximately constant speed with varying load within wide limits set by the design and capacity of the machine, i. e., within the limits indicated by the speed-load curve of the machine, the above indicated variations in torque and speed being smooth and continuous throughout.

A further purpose of my invention is to provide an induction motor having, like the synchronous motor, a corrective effect upon the power factor of the circuit, adjustable at will by the operator, the power factor of the machine being maintained at unity, or lagging or leading as may be required.

Also, I purpose providing a motor having a spinner device, which when the motor is in service, will turn at all times at synchronous speed and be capable of electromagnetically linked with both the rotor circuit and the said reversible element of the primary circuit, (B stator) in such a way as to set up magnetic stresses between these members and cause a flow of energy to pass from one circuit to the other by way of the spinner, the direction and volume of said flow of energy being completely controlled by the character and intensity of said electro-magnetic stresess which are variable at the will of the operator.

The action of the spinner here may be regarded as that of an electro-magnetic clutch, adjustable and reversible, linking the two circuits, or, more accurately, the spinner is a convenient and highly efficient channel through which energy may be caused to flow at will in either direction, so that slip energy from the rotor may be returned to the line, or line energy delivered to the rotor as desired and the performance of the machine varied accordingly.

A further purpose of my invention is to provide an induction motor which, like a synchronous motor and for similar reasons, may be satisfactorily operated on circuits of higher voltage than are induction motors of present types, thus often dispensing with the use of step-down transformers.

The above mentioned general objects of my invention, together with others inherent in the same, are attained by the device illustrated in the following drawings, the same being preferred exemplary forms of embodiment of my invention, throughout which drawings like reference numerals indicate like parts:

Figure 1:
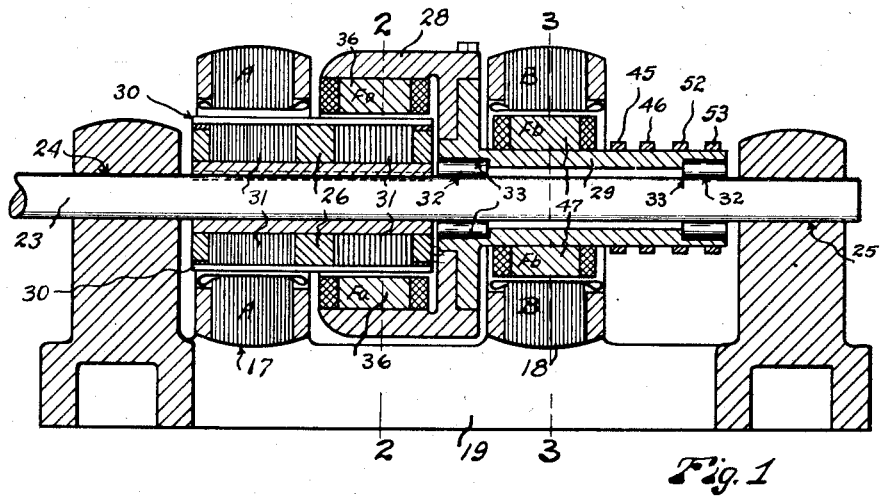
Figure 1 is a view in longitudinal vertical section through a variable speed polyphase induction motor embodying my invention.
Figure 2:
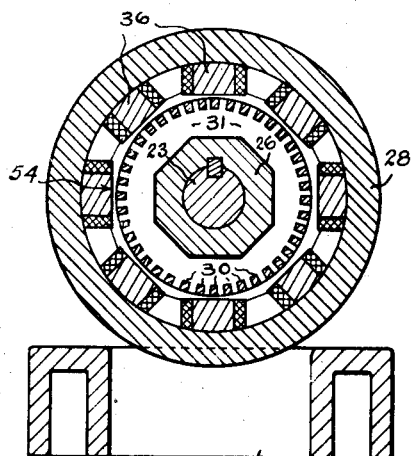
Fig. 2 is a view in cross section on line 2, 2 of Fig. 1 showing in section the field structure herein termed F$^a$ and the rotor within.
Figure 3:
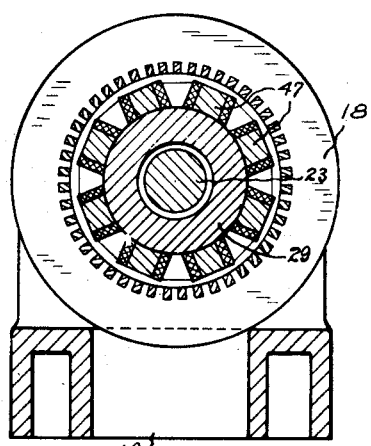
Fig. 3 is a view in vertical section on line 3, 3 of Fig. 1, showing in section the field F$^b$ and the stator B.
Figure 11:
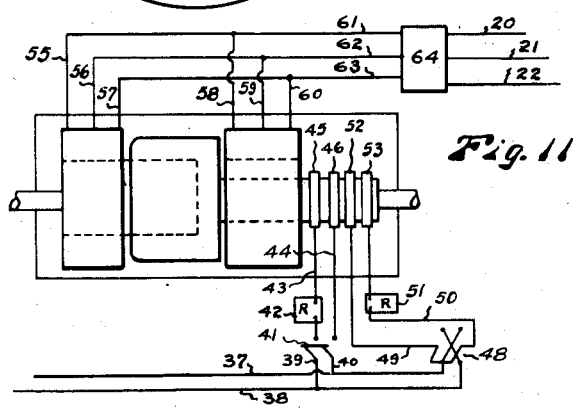

Figs. 5 and 6, 7 and 8, 9 and 10, represent respectively, simultaneous magnetic conditions across the two spinner air gaps under three distinct conditions of excitation;

Fig. 11 is a wiring diagram showing the electrical connections of the motor illustrated in Fig. 1;

Fig. 12 is a modified form of the device, illustrating modified forms of rotor and spinner;

Fig. 13 is a view on dotted line 13, 13 of Fig. 12 showing mounting of stator B in cradle and a means of adjustment;

Fig. 14 is a modified form of the motor showing modified forms of the rotor, spinner and one stator;

Fig. 15 is still another modified form of the motor; and

Fig. 16 is a fragmentary view of another modified form differing from the motor shown in Fig. 15 only in the construction of the spinner which here has two separately excited field circuits F$^a$ and F$^b$ as in the form first mentioned herein, one of these being reversible in polarity, their axes being here parallel to the shaft.

The primary or stator element of this machine is divided into two separate parts 17 and 18, hereinafter preferred to as stator A and stator B respectively. That is, instead of one stator with a capacity great enough to carry the total load on the machine, this motor will have two stators, the sum of whose rated capacities will be equal to the total capacity of the unit. These stators may be of equal capacity as in the machine here illustrated; they may even be exactly alike; they must be wound with the same number of poles, in this particular motor eight, but need differ in no essential respect from other induction motor stators of similar speed, voltage, frequency and rating. They will be mounted a short distance apart as shown, Fig. 1, and properly aligned on a suitable base 19, and their windings so connected in circuit that when a suitable polyphase alternating electromotive force is impressed across their terminals the phase rotation in both will be in the same direction at the same synchronous speed. In Fig. 11, the windings of stators A and B are represented as being connected in parallel across the supply circuit 20, 21 and 22. They may, however, be connected either in parallel or in series as appears more expedient in any particular case.

The shaft 23, passing through the axial center lines of both stators A and B and resting in the bearings 24 and 25 will carry two rotating structures, a rotor 26 and a spinner 27, said spinner consisting of two mounting members 28 and 29.

The rotor 26, of the common squirrel cage type, is keyed to the shaft 23, and is designed to deliver the whole power of the machine to that shaft; i. e., it will have a capacity equal to the combined capacities of the stators A and B. The diameter of said rotor is such that it will fit properly and revolve inside of the stator A. The length of said rotor 26 is great enough so that if the two stators A and B were mounted close together, the conductor bars 30 of said rotor would extend through both said stators. Actually, however, the two stators A and B are mounted somewhat apart as shown and the rotor 26 is keyed to the shaft 23 in such a position that one-half of its length is covered by the stator A while the remainder of its length extends beyond A along the shaft toward B. It is essential that the rotor bars 30 be not short circuited except at their ends because at certain times the electromotive force induced in the two halves of the bars will not be in phase. For this reason, the rotor bars 30 would be lightly insulated from the laminated iron structure 31 of the rotor 26 by treatment with shellac or other suitable means.

The spinner 27 is mounted idly upon the shaft 23 with roller or other suitable bearings 32. These bearings should be lightly insulated by suitable non-conducting material 33, from the rest of the spinner structure to minimize the heating effects of local eddy currents due to magnetic leakage between the spinner 27 and the rotor 26 through the shaft 23. The two mounting members of the spinner 28 and 29 may be given an angular adjustment with respect to each other in the direction of rotation, and locked rigidly in a desired relative position by tightening the cap screws 34 in the slots 35 provided in member 28, the purpose of this adjustment to appear hereinafter.

On member 28 is mounted a set of eight pole pieces 36 hereinafter referred to as the field $F^a$. This field will be separately excited by direct current supplied through conductors 37 and 38, (Fig. 11) from some suitable source through conductors 39 and 40, double pole single throw switch 41, variable resistance 42, and conductors 43 and 44 to the slip rings 45 and 46. This set of poles is so mounted that its pole faces are directed inwardly covering that portion of the rotor not covered by the core and polar windings of stator A, so that when the spinner 27 revolves, the field $F^a$ being excited, the flux issuing from $F^a$ will cut the rotor bars 30.

Figure 4:
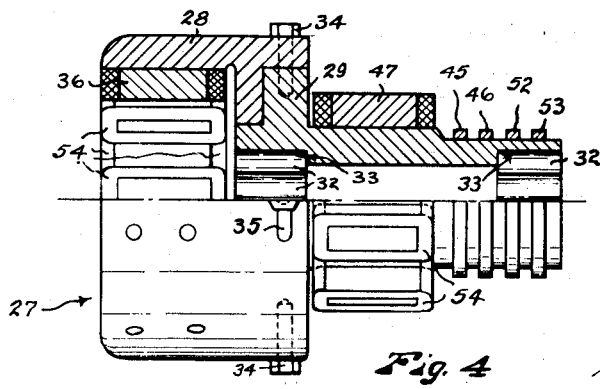
Fig. 4 is a view in longitudinal section in part and in elevation in part showing the spinner of the motor represented in Fig. 1.
Figure 5:
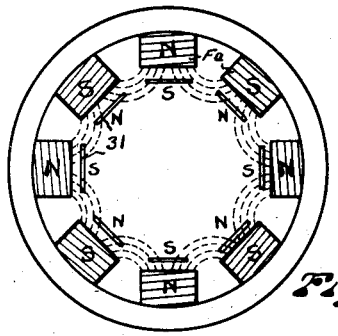
Figure 6:
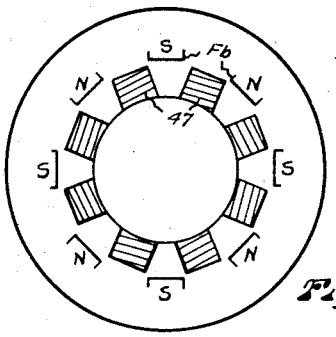
Figure 7:
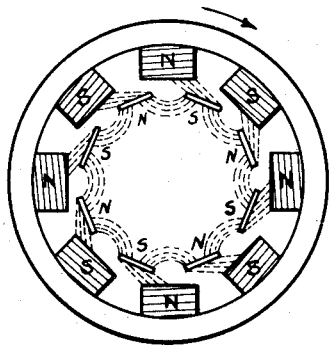
Figure 8:
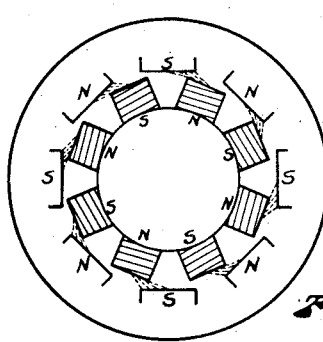
Figure 9:
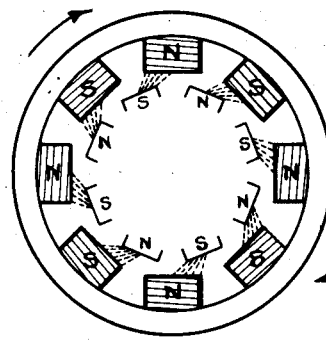
Figure 10:
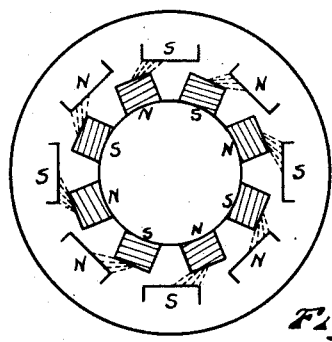

On the other member 29 of the spinner is provided another set of eight pole pieces 47, hereinafter referred to as $F^b$, having their faces outwardly directed and constructed so as to fit properly and revolve inside the stator B. This field $F^b$ also will be separately excited by direct current supplied through conductors 37 and 38, double pole double throw reversing switch 48, conductors 49 and 50, variable resistance 51, to slip rings 52 and 53. The pole pieces of both fields $F^a$ and $F^b$ will be provided with copper yokes or collars 54, Fig. 4, or squirrel cage structures such as are usually provided on the poles of self-starting synchronous motors.

It will be observed that the number of poles per phase in the windings of each stator A and B is exactly the same as the number of poles provided in each spinner field $F^a$ and $F^b$; this number being determined, for any particular machine, by the frequency of the supply circuit and the maximum speed at which the machine will be required to operate, the motor here considered being an eight pole unit, designed to operate at a maximum speed of less than 900 R. P. M. from a three phase 60 cycle circuit.

Stator A through its primary terminals 55, 56 and 57, and stator B through its primary terminals 58, 59 and 60 are connected through conductors 61, 62 and 63 and starting compensator 64 and supply line 20, 21 and 22 to a suitable source of three phase alternating current.

In the modified form of the device shown in Fig. 12, the faces of the poles of the spinner field $F^a$ are presented outwardly the same as those of the field $F^b$, and the form of the rotor 65 modified accordingly. That part of said rotor which is swept by the flux from the poles of the field $F^a$ has its laminated magnetic circuit on the outside of the conductors instead of inside of them as in the other part of the rotor. The form of the rotor conductors 66 themselves may also be modified to permit the field structure of $F^a$ to fit and revolve inside of them. Also one of the stators B in this form of the device is angularly adjustable, being mounted in a cradle 67 (Fig. 13), the position of the stator member being adjustable by means of the hand wheel 68 and worm 69. This form of the machine simplifies the construction of the spinner and also reduces somewhat the possibility of heating in the spinner bearings 70 by local eddy currents due to magnetic leakage between the spinner and shaft.

In the modified form shown in Fig. 14, the rotor 71 has conductors 72. In that portion of the rotor 71 not covered by the stator A, the conductors 72 are radially disposed in a plane perpendicular to the shaft 73. The magnetic circuit in this portion of the rotor 71 assumes an annular shape as does that of the stator B, the distributed phase windings of which are wound in slots 74 which are radially disposed, lying in a plane perpendicular to the shaft 73. The reversible set of spinner poles $F^b$ is here eliminated, while the remaining set $F^a$, mounted with their pole axes parallel to the shaft 73 on the one piece spinner 75, revolve in the space between the radially disposed phase windings of B and the radially out-turned halves of the rotor conductors 72, cutting both with their flux. In this form also one of the stators is angularly adjustable, being mounted in a cradle similarly as shown in Fig. 13. The spinner of this machine has only one set of slip rings 76 and 77. This form of the motor will permit the use of a relatively short shaft. This is important because the shorter the shaft the more rigid the motor structure, and consequently the less clearance necessary in the air gaps, a well recognized condition for the best operation of induction motors. This modified form provides a more simplified spinner, eliminates the reversible set of spinner poles, and one pair of slip rings, and should practically eliminate trouble due to magnetic leakage between spinner and shaft.

In the form of this device illustrated in Figs. 1 to 11 inclusive, an angular adjustment is provided between the two spinner elements $F^a$ and $F^b$. In the modified forms shown in Figs. 12 to 16 inclusive, having one stator angularly adjustable, the purpose served by the said adjustment between the spinner fields, is accomplished by shifting the position of the said movable stator. The purpose served by reversing one of the spinner fields in the first mentioned form may also be accomplished by a shifting of this movable stator through approximately 180 electrical degrees.

In the modified form shown in Fig. 15 the distributed phase windings of both stators A and B are wound in slots radially disposed and lying in planes perpendicular to the shaft 78. These polar wound surfaces face each other and between them revolve both the spinner 79 and the rotor 80. The spinner here is similar to that shown in Fig. 14, having one set of pole pieces and slip rings 81 and 82. The structure of rotor 80, however, is modified. Each conductor 83 of the rotor squirrel cage is here bent into the shape of a U, lying in a plane which passes through the center line of the shaft, the open end of the U preferably being directed toward the shaft, each end of each U-shaped conductor 83 being connected to one of two short circuiting rings 84 and 85. The two laminated magnetic circuits of the rotor core 86 and 87, corresponding to the laminated cores 31 of the two halves of the rotor 26 in the motor illustrated in Fig. 1, occupy the annular space within the U shaped conductors 83, with a ventilating air space 88 between them. In this modified form of my invention also one of the stators is movable, being mounted in a cradle similar to that shown in Fig. 13, and having an angular adjustment by means of which the torque and performance of the motor may be controlled, especially in units of small size and weight. This form of the motor simplifies the rotor and shortens the shaft.

The modified form shown in Fig. 16 is similar to that in Fig. 15 except that here again two spinner fields 89 and 90, $F^a$ and $F^b$ are provided as in the form first hereinbefore described, one of these fields 90 being reversible. To furnish direct exciting current to this reversible field 90 and to field 89, four slip rings 91, 92, 93 and 94 are provided. There is, however, no angular adjustment between the two fields $F^a$ and $F^b$ so one of the stators B is equipped with a cradle mounting and a hand wheel adjustment like that shown in Fig. 13, by which a proper setting of the machine can be obtained to give required torque across the spinner field air gaps. The reversing of this torque may be accomplished by reversing one of these fields. This provision is made to cover cases where, either on account of the size and weight of the movable stator or for convenience it is desirable to control the operation of the motor through a variable and reversible field $F^b$ rather than by shifting the movable stator.

The mode of operation of a motor embodying invention is as follows:

The form of the motor illustrated in Figs. 1 to 11 inclusive, manifestly, shows that the stator B together with the spinner field $F^b$ constitutes in all essential respects the stator and rotor respectively of an ordinary synchronous machine which will operate as either an alternator or as a synchronous motor, depending on whether the spinner is being driven ahead so that the field $F^b$ pulls ahead on the magnetic flux of the stator B, or drags backward on that flux, being pulled along with it.

Stator A, on the other hand, together with the rotor, constitutes in all essential respects an ordinary squirrel cage induction motor except that half the length of the rotor conductors is so disposed with reference to the pole faces of the spinner field $F^a$ that when the spinner is turning at synchronous speed and $F^a$ excited, then, no matter what the speed of the shaft 23 and rotor 26, the flux issuing from the pole faces of $F^a$ will cut the rotor conductors at exactly slip frequency and so furnish a means by which the phase and electromotive force of the currents in the rotor 26 may be modified by adjusting the field $F^a$.

From the above it is manifest that stator A may be accurately referred to as the induction machine stator and stator B as the synchronous machine stator.

It is further evident that the spinner 27 may be started from rest and accelerated almost to synchronous speed by connecting the windings of either stator A or B to a suitable alternating current supply circuit. If B is so connected, the revolving flux in B will cut the copper yokes on the poles of $F^b$, inducing currents therein and start the spinner 27 as an induction motor. If A be so connected, the flux in A will set up currents in the squirrel cage of the rotor 26. These in turn will induce currents in the yokes on the poles of $F^a$ and the spinner 27 will start as before. In either case, when the spinner 27 is up to speed, if the corresponding field circuit $F^b$ or $F^a$ be closed through a source of direct current the spinner 27 will drop into step and run as the rotor of a synchronous motor, at exactly synchronous speed, inducing in the windings of stator B a counter electromotive force which is exactly of line frequency, and in the rotor circuit one of exactly slip frequency, regardless of the speed of the shaft 23. It also appears that either field $F^a$ or $F^b$ when running excited is, in fact, the rotor of a synchronous motor and therefore by properly regulating the strength of either field, the power factor of the corresponding circuit, i. e., either the rotor or stator A primary, may be controlled at will. The spinner poles, it will be understood, have a starting winding which may be in any of the well-known forms of copper collars, yokes or squirrel cage structures. Herein they are shown of the yoke type.

The principle governing the adjustment of the motor embodying my invention is as follows:

The fields $F^a$ and $F^b$ may be so adjusted in position with respect to each other, by means of the angular adjustment provided above between the two members 28 and 29 of the spinner structure, that when both stators A and B are connected to the line and both fields properly excited, the spinner will run off both circuits at the same time in exact synchronism with each. In such a case there would be no torsional strain between the two members of the spinner structure, but each field would receive from its own circuit a share of the power required to drive the spinner light. Assume that this setting between the spinner members has been experimentally determined and marked, and that one member has been then shifted through an arc of about 90 electrical degrees and the members locked firmly in that relative position, by means of the cap screws 34.

If the spinner 27 is now brought up to speed and excited as before it will no longer run idly off from both circuits, but one of its members will run off from one circuit as a synchronous motor driving the other member as an alternator delivering power to the other circuit. Further, the flow of energy thus shunted between the two circuits is determined in magnitude by the tangential component of the magnetic pull across the spinner field air gaps, and in direction by the direction of that pull. It further appears that this tangential pull could have been set up by shifting either stator A or B as well as by shifting one of the spinner members, it can be varied in magnitude by varying the amount of the shift or varying the excitation of the field, and can be reversed by either reversing the direction of the shift or by reversing the polarity of one of the spinner fields $F^b$.

Now, assume that the motor herein described and embodying my invention is at rest and that it is desired to start the same under conditions requiring high torque at starting and at low speeds, with minimum disturbance of the supply circuit.

By means of a starting compensator or otherwise, there is impressed upon the primary windings of both stators A and B a small fraction of the line voltage. The spinner 27, being idly mounted will start and, being without load, will approach synchronous speed, behaving exactly as would any ordinary squirrel cage induction motor starting without load. When the spinner 27 is up to speed, direct current supplied by conductors 37 and 38 from some suitable source is delivered to the windings of $F^a$ through the slip rings 45 and 46, and at the same time full line voltage is impressed upon the primary windings of A and B.

When an ordinary squirrel cage induction motor with the shaft at rest is connected across the supply line, heavy lagging currents appear in both the rotor and stator windings, producing in the line a highly objectionable disturbance with poor power factor, much heating in the motor and proportionally little torque in the shaft. However, in the induction motor embodying my invention this effect is obviated by reason of the fact that as soon as direct current is supplied to the field $F^a$, that field drops into step with the currents flowing in the rotor 26, and becomes the rotor of a synchronous motor running light off the rotor circuit. A proper adjustment of the strength of the field $F^a$ by varying the resistance 42 will cause the spinner field $F^a$ to act as a synchronous condenser, introducing into the rotor circuit a condensive reactance, correcting the lagging power factor in the rotor 26 and even in the stator A and rendering said power factor lagging or leading as required. In general, the usual running condition will be such an adjustment of the field $F^a$ that the power factor in stator A at light loads will be slightly leading and about unity or slightly lagging as full load comes on. Accordingly, when line voltage is thrown across the terminals as mentioned above, the windings of stator A will draw from the line 20, 21 and 22 a current of approximately unity power factor and just great enough to furnish the energy consumed by its own no-load losses and to drive the spinner 27 idle. Stator B also will draw from the line its no-load stator exciting current only, because the field $F^b$ not being yet excited, there is no magnetic strain between the poles of $F^b$ and B, and as the spinner 27 is running at exactly synchronous speed, there is no relative motion between the flux of B and the pole collars of $F^b$ and therefore there is no transfer of energy between the spinner 27 and B.

Up to this point, the energy component of the rotor 26 currents will be small, as it corresponds only to the power required to drive the spinner 27 idle. The torque produced by this current will be proportionately small as only the energy current is of any effect in developing torque. We will assume that the shaft load is too great to be started from rest by this torque, which may now be increased as desired by putting an energy load on the spinner as follows:

Let the field circuit F$^b$ now be closed through a source of direct current, whereupon there will appear two superimposed magnetic fluxes revolving in the space occupied by the spinner field F$^b$ both revolving at synchronous speed and in the same direction but not necessarily in phase. In fact, the angular adjustment between the F$^a$ and F$^b$ mentioned hereinabove has been provided expressly so that F$^b$ could be so set that the above fluxes would be approximately 90 electrical degrees out of phase. Being thus out of phase the poles of the field F$^b$ will be subjected to a magnetic force tending to pull the spinner 27 either forward or backward enough to bring the field F$^b$ into phase with the flux in B stator, this torsional pull being opposed and balanced by a similar pull set up between the poles of the field F$^a$ and the flux in the rotor 26. In either case energy is being transmitted through the spinner 27 between the rotor 26 and B stator. If said magnetic strain through the spinner 27 tends to pull the rotor forward in the direction of rotation, then obviously B is acting as a motor and delivering line energy through the spinner 27 to the rotor 26 and vice versa, if the magnetic flux of B is pulling backward on the spinner field F$^b$, and the flux of the spinner field F$^a$ is pulling backward on that in the rotor 26, then clearly the field F$^a$ is running as a synchronous motor off the rotor circuit driving F$^b$ as the rotor of an alternator delivering energy from the rotor 26 to the line 20, 21 and 22 through the primary windings of B stator. This is the action desired and referred to above in putting a load upon the spinner 27. It is further obvious that this effect may be removed or reversed, merely by stopping or reversing the exciting current in the field F$^b$. In fact, by building up this exciting current of the field F$^b$ and then reversing it, we obtain a magnetic distortion somewhat analogous in effect to that in a double-primary squirrel cage motor when one stator is given an angular shift of 180 electrical degrees. For the purpose of starting the motor with its heavy torque load, as herein assumed, the field F$^b$ will be excited in such a way that it will tend to retard the spinner 27 with reference to the rotating field within the rotor 26. In other words, it will tend to put a peripheral pull upon the spinner 27 in such a direction as will tend to check its rotation, or in other words will act as a brake, absorbing power from the spinner 27, this power being derived in a similar manner from the rotor 26, and developing therein the increased energy current due to the loading of the spinner 27, and this increased energy current producing the increased torque necessary to start the load. That is, putting the "braking" load upon the spinner 27 increases the energy component on the rotor conductors 30 and with it the torque in the rotor 26, i. e., on the shaft 23. By further strengthening the field F$^b$, the peripheral strain across the spinner air gaps, the load on the rotor circuit, and the torque are all increased until the torque reaches a value sufficiently great to start the mechanical load on the shaft 23. During all this time the power factor in stator A is being maintained at approximately unity by the proper excitation of the field F$^a$. It is obvious that as respects stator B, the heavier the torque required to start the load, the greater would be the excitation of the field F$^b$ and therefore the better the power factor in the circuit B which is now operating as a regenerating circuit and returning the slip energy to the line 20, 21 and 22, so that throughout this starting operation the apparatus draws from the line 20, 21 and 22 a current of approximately unity power factor only great enough to supply the actual losses of the machine and the power actually delivered to the shaft 23.

The spinner 27 acting as an adjustable coupling link between the two circuits obviously affords a convenient and economical channel by which the slip energy can be drawn off from the rotor circuit and delivered to the line 20, 21 and 22. This operation is in striking contrast to the wasting of this slip energy as in grids or to the methods involving expensive auxiliary apparatus which must be idle at full speed.

In general, the torque required to start the load from rest will be greater than that necessary to keep it turning dead slow, and the shaft 23 will tend to accelerate until it attains a speed such that the power absorbed in turning the load is equal to that required to start the load from rest. On the other hand, as soon as the shaft starts, a part of the energy delivered to the rotor 26 is absorbed in turning the load, and only the remainder is then being regenerated through the spinner 27 and returned to the line 20, 21 and 22. This part of the rotor energy absorbed in turning the load increases with increasing speed, and the load on the regenerating circuit tends to decrease accordingly. However, assuming that the excitation of the field F$^a$ remains constant, then the spinner 27 will tend to shift ahead and assume a position somewhat further in advance of the revolving flux in the rotor 26, just as would any synchronous motor when its load is lightened and its field kept constant. This shifting of the spinner 27 ahead, however, tends to increase the displacement between the spinner field $F^b$ and the flux in stator B and thus tends to increase the regenerative load. Again, as long as the field strength of $F^b$ remains constant and spinner 27 turns at constant (synchronous) speed, the regenerated load tends to remain constant and therefore automatically prevent acceleration of the shaft 23, causing the motor to run at an approximately constant but slow speed, even though the load were removed. This fact checks the acceleration of the shaft and for any given load and field strength a point is presently reached where a balance is restored and the shaft will run at constant speed. This is in marked contrast with the usual operation of induction motors which immediately accelerate up to full speed as the load falls off. The motor involving my invention, by reason of this automatic corrective effect, prevents the objectionable acceleration to full speed, and thereby provides a means by which the motor can be operated at very low speeds even though the load be very light and full line voltage obtains across the terminals. If the speed at which the balance above mentioned becomes restored is too high, i. e., higher than that at which it is desired to run the load, the speed can be reduced by strengthening the spinner fields, because strengthening these fields increases the magnetic pull across the spinner air gaps, and therefore the volume of energy absorbed and passed on by the spinner 27 is increased. That is, more of the rotor power is tapped off and returned to the line by the spinner 27, so that less is available for turning the shaft 23 with its load and the motor necessarily slows down.

Suppose now it is desired to bring the load up to full speed: If the excitation of the field $F^b$ be now reduced by increasing the resistance 51, that will reduce the load in the regenerative circuit, increase the power available for turning the load, and the shaft 23 will be accelerated. If the excitation of the field $F^b$ be entirely removed, then the action of the stator B upon the spinner 27 and rotor 26 will be eliminated and stator B will not produce any currents in the copper yokes of the field $F^b$, because so long as the field $F^a$ is excited, the spinner 27 will be running at synchronous speed and there will be no relative motion between the field $F^b$ and the flux in stator B. Stator A is now carrying all the shaft load and also the windage loss of the spinner 27. If the shaft load is light, the rotor 26 will now be turning at nearly synchronous speed as in the case of any induction motor lightly loaded.

As touched upon above, the point to be particularly noted is that as the field $F^b$ is weakened, the regenerative action in the spinner 27 and in stator B is lessened, and the shaft 23 accelerates, the rate of acceleration varying with the load torque, and, as explained, when the exciting circuit of $F^b$ is opened, the regenerating effect vanishes, all the power delivered to the rotor 26 by way of the primary stator A will be absorbed in driving the load and supplying losses, and the shaft 23 will turn at a certain speed, just what that speed is will depend upon the load torque and to a certain extent upon the strength of the field $F^a$, because the strength of the field $F^a$ affects in some measure the power factor, and therefore the counter electromotive force in stator A.

Up to this point, all the motor energy has been furnished to the rotor 26 by way of the stator A. The spinner 27 and the stator B have so far served only to regulate the torque and power factor in the squirrel cage rotor 26 and to return the slip energy to the line regenerated as explained and to the extent desired. If now more power is to be applied to the shaft than is being furnished through A, or to relieve A of part of the load, the field circuit of $F^b$ may again be closed but with the terminals reversed. In this manner, the poles of $F^b$ will be excited with polarity (see Figs. 9 and 10) opposite to that used for regenerating (see Figs. 7 and 8) the slip energy. Whereas heretofore every pole piece on $F^b$, due to the adjustment hereinbefore explained, has been subject to a magnetic pull tending to drag it backward toward a pole of opposite polarity in the stator B (Figs. 7 and 8), now its polarity being reversed, every pole in the field will be repelled (See Figs. 9 and 10) by the pole of stator B that formerly attracted it, and will now be attracted by the stator pole running ahead of it. In short, the field $F^b$ will be subject to a magnetic pull dragging it forward, and as it responds and shifts ahead, it will drag forward the spinner 27 with it, and the spinner field $F^a$ will pull forward on the flux revolving in the rotor 26. In other words, the flow of energy through the spinner 27 is now reversed and stator B now becomes a part of the primary winding functioning in the usual way of a stator of a synchronous motor. Instead of tapping energy out of the rotor circuit, it is now drawing energy from the line 20, 21 and 22, and delivering it to the rotor 26, the amount of energy so transmitted, as before, varying with the strength of magnetic pull across the spinner field air gaps which will vary with the intensity of the excitation of the spinner fields $F^a$ and $F^b$. By properly controlling these fields, stator B may be caused to "grab" more than its share of the load, though it could never take it entirely away from stator A so long as stator A remains connected to the supply circuit 20, 21 and 22 because the rotor 26 will never quite come up to synchronous speed, no matter how light the load. The full speed running condition of the motor involving my invention would, in general, involve such an adjustment of the two fields $F^a$ and $F^b$ that at full load, the power factor in both stators will be approximately unity of slightly leading and the load divided equally between the two.

In general, the motor involving my invention may be considered as consisting essentially of an induction motor as respects that part of the primary windings herein referred to as stator A and the rotor 26, the secondary power factor of which is at all times under control by adjustment of field $F^a$ and a synchronous alternator stator B with its rotating field $F^b$, and an adjustable and reversible magnetic clutch connecting said motor and alternator by means of which the said alternator may at will be caused to run off the rotor 26, delivering energy to the supply circuit 20, 21 and 22, or to run off said supply line 20, 21 and 22, delivering power to the rotor 26 and shaft 23.

From another point of view, the spinner 27 may be regarded as a reversible member of a frequency converter whereby energy may be transmitted in either direction between the rotor 26 and the reversible stator B.

Obviously, the mode of operation of the modified forms herein described is similar in all essential respects to that hereinabove described. From the above, it is manifest that it is necessary to reverse the tangential component of the magnetic pull between the stator B and the rotor 26 through the spinner 27 in order to reverse the function of stator B. In the modified forms shown in Figs. 14 and 15, this reversing of the magnetic pull is accomplished by shifting the relative positions of the stator B by means of the cradle 67 and associated adjusting screw 69.

Obviously, changes may be made in the forms, dimensions and arrangement of the parts of my invention, without departing from the principle thereof, the above setting forth only preferred forms of embodiment.

I claim:—

1. A variable speed polyphase motor embodying two stator primary elements, an induction machine stator and a synchronous machine stator; a motor shaft; a synchronously rotating spinner, having two independent sets of separately excitable magnetic poles which energize two independent magnetic circuits, the flux in each circuit being disposed to move in its own exclusive path, whereby magnetic interference between the two circuits is eliminated; and a rotor keyed to said shaft, the conductors of which rotor have a portion of their length operatively presented to the induction machine stator and a portion of their length operatively presented to the spinner.

2. A variable speed polyphase motor embodying two stator primary elements, an induction machine stator and a synchronous machine stator; a motor shaft; a synchronously rotating spinner, having two independent sets of separately excitable magnetic poles which energize two independent magnetic circuits, the flux in each circuit being disposed to move in its own exclusive path, whereby magnetic interference between the two circuits is eliminated; a rotor keyed to said shaft, the conductors of which rotor have a portion of their length operatively presented to the induction machine stator and a portion of their length operatively presented to the spinner, and means whereby the tangential component of the magnetic strain across the spinner air gaps can be varied as to magnitude and reversed as to direction.

3. A variable speed polyphase motor embodying two stator primary elements, an induction machine stator and a synchronous machine stator; a motor shaft; a rotor keyed to said shaft, the conductors of which rotor have an axial length greater than the axial dimension of said induction machine stator; and a synchronously rotating spinner, having two independent sets of separately excitable magnetic poles which energize two independent magnetic circuits, the flux in each circuit being disposed to move in its own exclusive path, whereby magnetic interference between the two circuits is eliminated, one set of poles being operatively disposed with respect to that portion of the rotor not covered by the induction machine stator and one set operatively disposed with respect to said synchronous machine stator.

4. A variable speed polyphase motor embodying two stator primary elements, an induction machine stator and a synchronous machine stator; a motor shaft; a rotor keyed to said shaft, the conductors of which rotor have an axial length greater than the axial dimension of said induction machine stator; a synchronously rotating spinner, having two independent sets of separately excitable magnetic poles which energize two independent magnetic circuits, the flux in each circuit being disposed to move in its own exclusive path, whereby magnetic interference between the two circuits is eliminated, one set of poles being operatively disposed with respect to that portion of the rotor not covered by the induction machine stator and one set operatively disposed with respect to said synchronous machine stator; means of supplying direct current adjustable as to magnitude to each of said set of spinner poles; and means for reversing the field circuit of one of said sets of spinner poles.

In witness whereof I hereunto subscribe my name this 28th day of December, 1927.

BYRON E. SMITH.